(12) United States Patent
Masaki et al.

(10) Patent No.: US 6,790,523 B2
(45) Date of Patent: Sep. 14, 2004

(54) MAGNETIC RECORDING MEDIUM

(75) Inventors: Kouichi Masaki, Kanagawa (JP); Takako Ozawa, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/402,966

(22) Filed: Apr. 1, 2003

(65) Prior Publication Data
US 2003/0190495 A1 Oct. 9, 2003

(30) Foreign Application Priority Data
Apr. 3, 2002 (JP) ..................................... P.2002-101463

(51) Int. Cl.$^7$ .............................................. G11B 5/706
(52) U.S. Cl. ................................ 428/329; 428/694 BH; 428/694 SG
(58) Field of Search .......................... 428/329, 694 BH, 428/694 SG

(56) References Cited

U.S. PATENT DOCUMENTS 5,079,092 A * 1/1992 Maekawa et al. ............ 428/403
5,118,575 A * 6/1992 Maekawa et al. ............ 428/403
5,626,956 A * 5/1997 Hopstock et al. ............ 428/323

* cited by examiner

Primary Examiner—Steven A. Resan
(74) Attorney, Agent, or Firm—Sughrue Mion, PLLC

(57) ABSTRACT

A magnetic recording medium comprising: a support; and at least a magnetic layer comprising a hexagonal ferrite powder and a binder, wherein the hexagonal ferrite powder is of magnetoplumbite type and has an average diameter of 15 to 35 nm and an alkaline earth element to iron ratio of 0.10 to 0.15 in terms of peak intensity ratio analyzed by electron spectroscopy for chemical analysis.

10 Claims, 1 Drawing Sheet

MAGNETIC RECORDING MEDIUM

FIELD OF THE INVENTION

This invention relates to a magnetic recording medium, such as a magnetic tape. More particularly, it relates to a particulate magnetic recording medium which is less prone to suffer from reduction in output and maintains stable running properties when used or stored under various environmental conditions.

BACKGROUND OF THE INVENTION

Magnetic recording technology has enjoyed wide-scale adoption in various fields including video, audio, and computers because of its unparalleled characteristics such that a recording medium can be used repeatedly, signals are converted easily, making it possible to construct a system with peripheral equipment, and signals can be corrected easily.

In order to meet the outstanding demands for equipment size reduction, improvement on write and read signal quality, extension of recording time, increase of recording capacity, and the like, it has always been required to develop recording media with higher recording density, higher reliability, and improved durability.

In the audio and video fields, for example, a digital recording system which realizes improvement on sound and image qualities has been put to practical use, and an image recording system coping with high-definition TV broadcasting has been developed. These trends have boosted the demand for magnetic recording media which are capable of recording and reproducing shorter wavelength signals than with conventional systems and maintaining excellent reliability and durability even if the medium's running speed relative to a recording head increases. For computer applications, too, it has been keenly demanded to develop a large capacity digital recording medium capable of storing an ever-increasing amount of data.

Various approaches have been proposed to increase the recording density of particulate magnetic recording media, such as replacement of conventionally used magnetic iron oxide powder with iron or iron-based alloy magnetic powder, improvement on magnetic characteristics of magnetic powder by particle size reduction or by improving powder packing and orientation, improvement on ferromagnetic powder dispersibility, and improvement on surface properties of the magnetic layer.

For example, use of a hexagonal ferrite powder as ferromagnetic powder is proposed to obtain increased magnetic characteristics as disclosed in JP-A-58-122623, JP-a-61-74137, JP-B-62-49656, JP-B-60-50323, and U.S. Pat. Nos. 4,629,653, 4,666,770, and 4,543,198.

Addition of various surface active agents is suggested to increase dispersibility of ferromagnetic powder as disclosed in JP-A-52-156606, JP-A-53-15803, and JP-A-53-116114. For the same purpose addition of various reactive coupling agents is taught in JP-A-49-59608, JP-A-56-58135, and JP-B-62-28489. Surface treatments on an applied and dried magnetic layer have also been proposed to improve the surface properties of the magnetic layer as described in JP-B-60-44725.

A number of processes are available for producing hexagonal ferrite magnetic powders. Known processes include (a) a coprecipitation process comprising bringing into contact a metal ion aqueous solution containing iron chloride, an alkaline earth metal salt and, if necessary, a chloride of a doping element with an alkali (e.g., NaOH) solution to coprecipitate metal ions, washing the precipitate with water, drying the precipitate, and crystallizing the precipitate at a high temperature, (b) a hydrothermal process comprising crystallizing metal ions from the metal ion aqueous solution used in the process (a) in a high-temperature high-pressure container and, if necessary, heating the crystals in high temperatures (see JP-A-56-160328), (c) a flux method comprising crystallizing compounds containing iron and an alkaline earth metal at high temperatures in the presence of a flux (e.g., NaCl or $BaCl_2$) and removing the flux from the crystals, and (d) a process by controlled crystallization of glass which comprises blending a glass-forming oxide (e.g., BaO, $B_2O_3$ or $SiO_2$), an iron compound, a barium compound and, if desired, a compound of a doping element, melting the blend, rapidly cooling the melt into an amorphous solid (glass), re-heating the solid in high temperatures for crystallization, and removing the glass-forming oxide (see JP-A-56-67904). JP-A-60-240107 and JP-A-3-78209 teach that barium ions dissolved from magnetic powder impair wear resistance of the magnetic layer, resulting in reduction of reliability for output, running stability, and durability and that this problem is solved by treating the magnetic layer with water containing sulfate ions or carbonate ions.

As the demands for equipment size reduction, improvement on write and read signal quality, extension of recording time, and increase of recording capacity are being achieved, the diversity of the environment in which magnetic recording media are used are increasing. It has now come to be necessary for magnetic recording media to show as stable running properties as in usual applications even when used or stored in various environments. A magnetic recording medium having at least two layers on a support, i.e., anonmagnetic layer mainly comprising non-magnetic powder and a binder as a lower layer and a magnetic layer mainly comprising ferromagnetic powder and a binder as an upper layer, exhibits high performance because it has in principle low self-magnetization loss and also has small surface roughness, namely small spacing loss. However, such a multilayer magnetic recording medium has turned out to suffer from the following problems when stored under high-temperature and high-humidity conditions depending on the surface properties of the hexagonal ferrite powder used in the upper magnetic layer and the non-magnetic powder used in the lower non-magnetic layer and impurities of these powders. That is, it shows a reduced output in electromagnetic measurement and an increased frictional coefficient in a running test after storage under high-temperature and high-humidity conditions. In an extreme case the medium can cling to a magnetic head to stop running.

SUMMARY OF THE INVENTION

An object of the present invention is to provide a magnetic recording medium which is less prone to suffer from reduction in output and keeps excellent running properties when used or stored under various environmental conditions.

The present invention provides a magnetic recording medium comprising a support and at least a magnetic layer containing a hexagonal ferrite powder and a binder, wherein the hexagonal ferrite powder is of magnetoplumbite type and has an average diameter of 15 to 35 nm and an alkaline earth element to iron ratio of 0.10 to 0.15 in terms of peak intensity ratio analyzed by electron spectroscopy for chemical analysis (hereinafter abbreviated as ESCA).

DETAILED DESCRIPTION OF THE INVENTION

Figure 1:
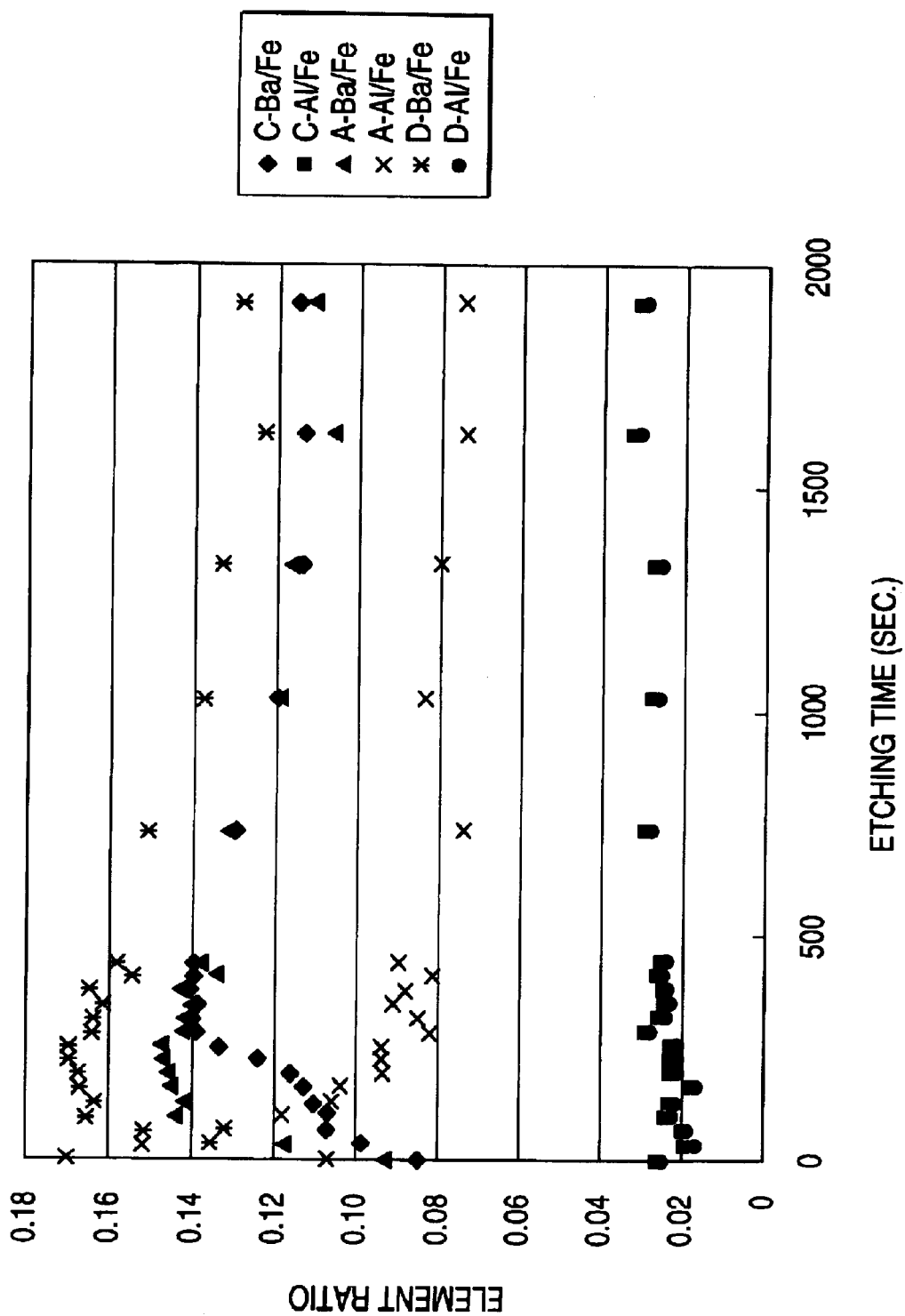
FIG. 1 graphically shows changes of Ba/Fe ESCA intensity ratio and Al/Fe ESCA intensity ratio of magnetic powders A, C, and D with etching time in ESCA.

In order to develop a magnetic recording medium having a magnetic layer comprising a hexagonal ferrite powder and a non-magnetic layer comprising a non-magnetic powder which is less prone to deteriorate in output and running properties when used or stored under various environments, the present inventors have extensively investigated into the influences of the surface properties and impurities of the hexagonal ferrite powder and the non-magnetic powder. They have analyzed the surface of a hexagonal ferrite powder of magnetoplumbite type (hereinafter referred to as an M type) by ESCA, also called X-ray photoelectron spectroscopy (XPS), to determine the ratio of alkaline earth element atoms to Fe atoms present on the surface. They have revealed the relationship between this ratio and improvements on output and running properties under various environments and reached the present invention.

The alkaline earth element/iron ratio in terms of ESCA intensity ratio is determined as follows. X-Ray Photoelectron Spectrometer AXIS-ULTRA (made by Kratos; X-ray source: Mg anode; accelerating voltage: 12 kV; source current: 10 mA) was used. A sample (M type hexagonal ferrite powder) is pressed into the sample holder and analyzed while being etched with argon ions over an area of 2 mm×2 mm. Elements found to be present in amounts of 0.05 atom percent or more as a result of bulk composition analysis are selected. For example, peak data of Ba3d, Fe3p, O1s, C1s, Al2p, Co2p, Zn2p, and Nd3d are taken at a data interval of 0.1 eV. The peak intensity of each element is converted to the number of the atoms by use of the respective response factor and represented in terms of ratio to the total elements inclusive of Fe taken as 100 to obtain a ratio of the respective atoms to Fe atoms. The atomic number ratio of a specific element to Fe present on the surface of an M type hexagonal ferrite powder, hereinafter represented by specific element/Fe ESCA intensity ratio, varies with etching time. The ESCA spectra measured in a time period of from 90 seconds to 150 seconds from the start of Ar etching, which corresponds to a time period in which the C/Fe ratio at 0 second etching decreases to ⅓ to ⅕, are used for analysis. The specific element/Fe ratios obtained from the respective average peak intensities of these spectra are taken as ratios of the respective elements present on the powder surface. The ranges of the elemental analysis peak measurement are as shown in Table 1 below. The "alkaline earth element/iron ESCA intensity ratio" as used in the invention is the "specific element/iron ESCA intensity ratio" in which the specific element is an alkaline earth element. Where there exist two or more alkaline earth elements, this means the ratio of total alkaline earth elements to iron.

TABLE 1

| Element Peak | Start of Measurement (eV) | End of Measurement (eV) |
|---|---|---|
| Ba3d | 805 | 768 |
| Fe3p | 736 | 700 |
| O1s | 544 | 515 |
| C1s | 296 | 273 |
| Al2p | 80 | 60 |
| Co2p | 800 | 768 |
| Zn2p | 1054 | 1010 |
| Nd3d | 212 | 199 |

As a result of intensive investigation on a range of alkaline earth element/iron ESCA intensity ratio preferred for storage stability, it has now been found that the range of from 0.10 to 0.15 achieves suppression of output reduction due to storage.

It has also been found that an M type hexagonal ferrite powder having a water-soluble Na content of 0 to 100 ppm/g, preferably 0 to 60 ppm/g, and a total water-soluble alkaline earth element content of 0 to 50 ppm/g, preferably 0 to 40 ppm/g, is effective in suppressing formation of fatty acid salts to provide a magnetic recording medium having excellent storage stability without suffering from deterioration in output and electromagnetic characteristics such as a C/N ratio.

The present inventors had studied on the non-magnetic powder for use in the lower non-magnetic layer in connection with storage stability to find that it is preferred for an iron-free non-magnetic substance for this use to have minimized contents of water-soluble alkali metals (mainly Na) and water-soluble alkaline earth metals. The inventors have now ascertained that the same applies to a non-magnetic iron compound. Specifically, they found it desirable that the non-magnetic powder to be used in the lower layer, particularly a non-magnetic iron compound has a water-soluble Na content of 0 to 150 ppm/g (particularly 0 to 100 ppm/g), a total water-soluble alkaline earth metal content of 0 to 50 ppm/g (particularly 0 to 40 ppm/g), and capability of forming an iron complex of 0 to 10 ppm/g (particularly 0 to 6.0 ppm/g). A magnetic recording medium having a lower non-magnetic layer comprising a non-magnetic powder satisfying these conditions and an upper magnetic layer comprising an M type hexagonal ferrite powder containing little water-soluble impurity and having an alkaline earth element/Fe ESCA intensity ratio of 0.10 to 0.15 is excellent particularly in storage stability among the practical characteristics including running properties, durability, and storage stability.

The method of controlling the alkaline earth element/Fe ESCA intensity ratio of a hexagonal ferrite powder within the recited range is arbitrarily chosen with no particular restriction.

The inventors have investigated into various factors for the purpose of controlling the alkaline earth element/Fe ESCA intensity ratio. They have revealed as a result that hexagonal ferrite particles coated with a hydrated alumina layer or a combination of a hydrated alumina layer and a zinc oxide layer are less susceptible to output reduction due to storage even with the alkaline earth element/Fe ESCA intensity ratio being 0.10 to 0.15. Where a spinel type ferrite layer is incorporated into hexagonal ferrite particles or formed on the surface of hexagonal ferrite particles, the alkaline earth element/Fe ESCA intensity ratio decreases lower than 0.1. However, on account of difficulty of uniform incorporation, SFD (switching field distribution) deteriorates to reduce shorter wavelength output. Where the alkaline earth element/Fe ESCA intensity ratio is 0.16 or higher, a recorded magnetic recording medium suffers from output reduction in a wet heat storage test. Close observation on a recorded and wet-heat stored medium with such a high alkaline earth element/Fe ESCA intensity ratio reveals precipitation of fatty acid metal salts, which cause spacing loss.

In order to control the amount of iron complexes formed by the non-magnetic powder, especially non-magnetic iron compound powders such as $\alpha$-$Fe_2O_3$ and $\alpha$-FeOOH, within a range 0 to 10 ppm/g, it is effective to thoroughly wash $\alpha$-$Fe_2O_3$ or $\alpha$-FeOOH with water to remove sulfate ions, phosphate ions, etc. It is preferred that the water-washed particles be further washed with an alkali to remove sulfate ions, phosphate ions, etc., followed by rinsing with water, thereby to render the particles alkaline. Surface treatment of α-Fe$_2$O$_3$ or α-FeOOH with an aluminum compound and/or a zinc compound is also effective in reducing formation of iron complexes. It is more effective to make the resulting surface treated particles alkaline. Because the surface treatment with an aluminum compound and/or a zinc compound controls the basic sites, the resulting particles not only exhibit improved dispersibility in a resin binder but control adsorption of fatty acids, eventually deciding the amount of free fatty acids on the surface of a magnetic recording medium. While not necessarily clear, complex formation reduction observed when the particles are made alkaline is considered to be because the solubility of Fe(OH)$_3$ decreases with pH increase, resulting in reduction of iron complex formation. Besides, considering that alkaline earth metals are less soluble in water at a higher pH, it is a preferred approach to make the particles alkaline. A preferred pH of α-Fe$_2$O$_3$ and α-FeOOH is 6.0 to 10, particularly 6.5 to 9.5, as measured according to JIS-A method.

In short, use of an M type hexagonal ferrite powder having an alkaline earth element/Fe ESCA intensity ratio of 0.10 to 0.15 in an upper magnetic layer and use of a non-magnetic powder having capability of forming iron complexes of 0 to 10 ppm/g and specifically controlled water-soluble Na and water-soluble alkaline earth metal contents in a lower non-magnetic layer provide a magnetic recording medium which can avert formation of salts of fatty acids with metals (e.g., Fe, Ba, Sr, Ca, Mg, and Na) and therefore exhibits excellent storage stability in terms of running properties (low frictional coefficient) and electromagnetic characteristics such as output and C/N.

The water-soluble Na content and the total water-soluble alkaline earth metal content of the hexagonal ferrite powder and the non-magnetic powder are determined as follows. The powder weighing 5 g is extracted with 100 ml of distilled water by stirring for 1 hour. The supernatant liquor is filtered, and the filtrate is analyzed by atomic absorption spectroscopy (ASS) to determine K and by inductively coupled plasma-atomic emission spectroscopy (ICP-AES) to determine alkali metals except K and alkaline earth metals. The contents are expressed by ppm per gram (mass concentration per gram of the hexagonal ferrite powder or the non-magnetic powder).

The amount of iron complexes formed by a non-magnetic powder is measured as follows. A non-magnetic powder weighing 2 g is immersed in 50 ml of a 0.05 mol/l ethanol solution of purified benzohydroxamic acid and maintained at 25° C. for 20 hours, followed by filtration. The absorbance of the filtrate is measured to know the concentration of the benzohydroxamic acid iron complex in the solution from a previously prepared calibration curve. The mass of iron ions of the complex formed per gram of the non-magnetic powder is calculated.

Where the magnetic recording medium of the invention has a dual layer structure, it is preferred to use fine particles in the lower non-magnetic layer so that the lower layer may have a small surface roughness. There is a fear that some non-magnetic powders, especially inorganic powders, gain in surface catalytic activity as the particle size becomes smaller. Countermeasures against this include reduction of catalytic activity of the non-magnetic powder. For example, it is known that photocatalysis of titanium oxide fine particles can be reduced by dissolving trivalent ions, e.g., of Al or Fe in solid solution into the titanium oxide crystalline phase and further treating the titanium oxide particles with alumina, silica-alumina, etc. It is also known effective to surface treat acicular α-Fe$_2$O$_3$ particles with an Al compound, an Al—Si compound, an Al—P compound, an Al—Ti compound, an Al—Ni compound, or an Al—Zn compound (see JP-A-6-60362).

The pH of a non-magnetic powder varies according to the composition of the powder, trace impurities, surface treating conditions (the kind of a treating compound, the throughput, etc.), and the like. Specifically, the pH of a non-magnetic powder can be adjusted to 6 to 10 by (1) suspending the powder in an alkaline aqueous solution and subjecting the suspension to a heat treatment (e.g., 60 to 200° C.) and/or (2) surface treating the powder with an inorganic substance. To secure satisfactory running properties, it is known necessary that a controlled amount of a lubricant be present in a free form on the surface of a magnetic tape. To improve storage stability, lower capability of forming iron complexes and a higher pH are advantageous. However, a non-magnetic powder having too high a pH allows an increased amount of a fatty acid to be adsorbed thereto. It would follow that the amount of the fatty acid in a form bound to the magnetic recording medium increases whereas that in a free form on the medium surface decreases, resulting in an increased frictional coefficient, namely reduced running properties. The increase of the frictional coefficient due to shortage of free fatty acids can be suppressed by treating the non-magnetic powder with an organic substance having an acidic functional group with higher adsorbability than fatty acids prior to dispersing. This manipulation not only secures a necessary amount of a free fatty acid enough to maintain a small frictional coefficient but is effective for storage stability. The organic substance having an acidic functional group with stronger adsorbability than fatty acids includes organic phosphoric acid compounds, organic phosphonic acid compounds, organic sulfonic acid compounds, and organic hydroxamic acid compounds. Such an organic substance is usually used in an amount of 0.5 to 6.0 parts by weight, preferably 1.0 to 5.0 parts by weight, per 100 parts by weight of the non-magnetic powder.

Two or more kinds of non-magnetic powders can be used in combination as long as their total capability of forming iron complexes falls within the recited range and, preferably, the pH of the mixed powders is within the above-recited range. The non-magnetic powders to be used preferably have a particle size of 0.01 to 0.5 μm. If desired, non-magnetic powders different in particle size may be used in combination, or a single kind of a non-magnetic powder having a broadened size distribution may be used to produce the same effect. The non-magnetic powder maybe subjected to surface treatment for the purpose of enhancing the interaction with a binder resin thereby improving dispersibility. Surface treating agents usable for this purpose include inorganic substances, such as aluminum salts, silicon salts, zinc salts, silica, alumina, and silica-alumina; and coupling agents, such as functional group-terminated silane coupling agents and titan coupling agents. The non-magnetic powder preferably has a tap density of 0.3 to 1.5 g/ml, a water content of 0.2 to 5% by weight, and a specific surface area of 5 to 150 m$^2$/g. The particle shape may be any of needle-like, spherical, polygonal and tabular shapes. Materials of the non-magnetic powder are not particularly limited and include inorganic compounds, such as α-Fe$_2$O$_3$, α-FeOOH, and titanium dioxide, and organic compounds.

The M type hexagonal ferrite powder used in the magnetic layer is not particularly limited in composition as long as the alkaline earth element/Fe ESCA intensity ratio falls within the range 0.10 to 0.15. As previously described, it is preferred for the magnetic powder to have a water-soluble Na content of 0 to 100 ppm/g and a total water-soluble alkaline earth element content of 0 to 50 ppm/g. Suitable M type hexagonal ferrite powders include barium ferrite, strontium ferrite, lead ferrite, calcium ferrite, and doped M type ferrites. These ferrites may contain doping elements, such as Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge, and Nb. Usually, M type hexagonal ferrites doped with Co—Ti, Co—Ti—Zr, Co—Nb, Co—Ti—Zn, Co—Zn—Nb, Ni—Ti—Zn, Nb—Zn, Ni—Ti, Zn—Ti, Zn—Ni, etc. can be used.

While the hexagonal ferrite powder used in the invention primarily comprises M type ferrite powder, a composite type ferrite or a spinel-type ferrite may be used in combination unless such a combined use impairs the effects of the invention. From the standpoint of SFD, an M type hexagonal ferrite is preferably used alone rather than in combination with composite type or spinel type ferrites. The coercive force of the hexagonal ferrite powder can be controlled by composition, particle size (diameter and thickness), thickness of a spinel phase of the hexagonal ferrite, amount of doping elements, site of doping, and the like. These manners of coercive force control can be applied to the present invention appropriately.

The M type hexagonal ferrite powder used in the invention is usually hexagonal plate-shaped (tabular) particles. The particle size is defined and measured as follows. The particle size of powder composed of particles having various sizes like the hexagonal ferrite powder of the invention is measured from high-resolution transmission electron micrographs with the aid of an image analyzer. The particle size is represented by (1) length of a major axis where a particle is needle-shaped, spindle-shaped or columnar (with the height greater than the maximum diameter of the base), (2) a maximum diameter of a main plane or a base where a particle is tabular or columnar (with the height smaller than the maximum diameter of the base), or (3) a circle equivalent diameter where a particle is spherical, polygonal or amorphous and has no specific major axis. The "circle equivalent diameter" is calculated from a projected area.

The average particle size of the powder is an arithmetic mean calculated from the particle sizes of about 350 primary particles measured as described above. The term "primary particles" denotes particles dependent of each other without agglomeration or individual particles gathered into an agglomerate.

The average aspect ratio of the powder is an arithmetic mean of major axis length/minor axis length ratios of particles measured as described above. The term "minor axis length" as used herein means the diameter of a particle defined in (1) above or the thickness or height of a particle defined in (2) above. Particles defined in (3) above, having no distinction between major and minor axes, are regarded to have an aspect ratio of 1 for the sake of convenience. The term "average particle size" as used herein refers to the "average major axis length" of a particle having the shape identified in (1) above; the "average diameter" of a particle having the shape identified in (2); or the "average circle equivalent diameter" of a particle having the shape identified in (3).

The hexagonal ferrite powder used in the invention has an average particle size (average diameter) of 15 to 35 nm, an average thickness of 2 to 15 nm, preferably 4 to 10 nm, and an average aspect ratio of 1.5 to 4, preferably 2 to 3.8. Particles having an average particle size smaller than 10 nm have a too large specific surface area and are difficult to disperse. The hexagonal ferrite powder preferably has a BET specific surface area ($S_{BET}$) usually of 25 to 110 m$^2$/g, preferably 40 to 100 m$^2$/g. An $S_{BET}$ less than 25 m$^2$/g results in high noise. Particles with an $S_{BET}$ exceeding 110 m$^2$/g are difficult to disperse for obtaining satisfactory surface properties. The water content and the pH of the hexagonal ferrite powder are preferably optimized according to the kind of the binder resin used in combination. A preferred water content is 0.3 to 2.0% by weight. The pH is usually from 5.0 to 12, preferably 5.5 to 10.

Methods for obtaining a hexagonal ferrite powder or a non-magnetic powder having a water-soluble Na content of 0 to 150 ppm/g and a total water-soluble alkaline earth melt content of 0 to 50 ppm/g are not particularly limited. Basic approaches include (1) selecting raw materials containing no or little such impurity content, (2) removing these elements that have entered in reaction systems involved in the preparation of the powders by, for example, washing, and (3) adopting reaction systems that will not allow these elements to generate. Along these lines, an appropriate method of preparing, for example, goethite (α-FeOOH) can be selected. Na salts present in reaction systems can be exchanged for Ca salts by ion exchange, followed by washing the product with distilled water to reduce the Ca salts to obtain powder with reduced Ca and Na contents. It is also effective to dehydrate goethite (α-FeOOH) into α-Fe$_2$O$_3$, which is again washed with water. In this case, too, the above-described ion-exchange process can be adopted.

The hexagonal ferrite powder preferably has a saturation magnetization of 40 A·m$^2$/kg or higher, particularly 42 to 65 A·m$^2$/kg. The hexagonal ferrite powder usually has a coercive force (Hc) of 135 to 440 kA/m, preferably 150 to 400 kA/m. With a coercive force less than 135 kA/m, the magnetic layer fails to produce high output in the short wavelength region. With a coercive force more than 440 kA/m, load will be imposed to the recording head, resulting in a failure to record sufficiently or deterioration of overwrite characteristic.

The hexagonal ferrite powder may be pre-treated with a dispersant, a lubricant, a surface active agent, an antistatic agent, etc. before being dispersed in a binder resin. For the details of the pre-treatment, reference can be made in JP-B-44-14090, JP-B-45-18372, JP-B-47-22062, JP-B-47-22513, JP-B-46-28466, JP-B-46-38755, JP-B-47-4286, JP-B-47-12422, JP-B-47-17284, JP-B-47-18509, JP-B-47-18573, JP-B-39-10307, JP-B-48-39639, U.S. Pat. Nos. 3,026,215, 3,031,341, 3,100,194, 3,242,005, and 3,389,014.

The water content of the hexagonal ferrite powder is preferably optimized according to the kind of the binder resin used in combination. A preferred water content is 0.3 to 2.0% by weight.

The binder resin which can be used in the magnetic layer and the non-magnetic layer includes conventionally known thermoplastic resins, thermosetting resins and reactive resins, and mixtures thereof. The thermoplastic resins used as a binder usually have a glass transition temperature of −100 to 150° C., an number average molecular weight of 1,000 to 200,000, preferably 10,000 to 100,000, and a degree of polymerization of about 50 to 1000. Such thermoplastic resins include homo- or copolymers comprising a unit derived from vinyl chloride, vinyl acetate, vinyl alcohol, maleic acid, acrylic acid, an acrylic ester, vinylidene chloride, acrylonitrile, methacrylic acid, a methacrylic ester, styrene, butadiene, ethylene, vinyl butyral, vinyl acetal, a vinyl ether, etc.; polyurethane resins, and various rubber resins. Useful thermosetting or reactive resins include phenolic resins, epoxy resins, thermosetting polyurethane resins, urea resins, melamine resins, alkyd resins, reactive acrylic resins, formaldehyde resins, silicone resins, epoxypolyamide resins, polyester resin/isocyanate prepolymer mixtures, polyester polyol/polyisocyanate mixtures, and polyurethane/polyisocyanate mixtures.

In order to ensure improved dispersing capabilities for the hexagonal ferrite powder and improved durability of the magnetic layer, it is preferred to introduce into each of the above-recited binder resins at least one polar group by copolymerization or through addition reaction, the polar group being selected from —COOM, —SO$_3$M, —OSO$_3$M, —P=O(OM)$_2$, —O—P=O(OM)$_2$ (wherein M is a hydrogen atom or an alkali metal base), OH, —NR$_2$, —N$^+$R$_3$ (wherein R is an alkyl group, an alkenyl group, an acyl group or an aryl group), an epoxy group, SH, CN, and the like. The amount of the polar group to be introduced is $10^{-1}$ to $10^{-8}$ mol/g, preferably $10^{-2}$ to $10^{-6}$ mol/g.

The binder is used in the magnetic layer in an amount of 5 to 50% by weight, preferably 10 to 30% by weight, based on the hexagonal ferrite powder. Where a vinyl chloride resin, a polyurethane resin, and polyisocyanate are used in combination, their amounts are selected from a range of 5 to 100% by weight, a range of 2 to 50% by weight, and a range of 2 to 100% by weight, respectively, based on the hexagonal ferrite powder.

The packing density of the hexagonal ferrite powder in the magnetic layer is calculated from maximum saturation magnetization σs and maximum magnetic flux density Bm of the powder (Bm/4πσs). The Bm/4πσs value is desirably 1.7 g/ml or greater, more desirably 1.9 g/ml or greater, most desirably 2.1 g/ml or greater.

The polyurethane to be used preferably has a glass transition temperature of –50 to 100° C., an elongation at break of 10 to 2000%, a stress at rupture of 0.05 to 10 kg/mm$^2$ (≈0.49 to 98 Mpa), and a yield point of 0.05 to 10 kg/mm$^2$ (≈0.49 to 98 Mpa).

The polyisocyanate which can be used in the invention includes tolylene diisocyanate, 4,4'-diphenylmethane diisocyanate, hexamethylene diisocyanate, xylylene diisocyanate, naphthyelene-1,5-diisocyanate, o-toluidine diisocyanate, isophorone diisocyanate, and triphenylmethane triisocyanate. Further included are reaction products between these isocyanate compounds and polyols and polyisocyanates produced by condensation of these isocyanate compounds. Examples of commercially available polyisocyanates which can be used in the invention are Coronate L, Coronate HL, Coronate 2030, Coronate 2031, Millionate MR, and Millionate MTL (from Nippon Polyurethane Industry Co., Ltd.); Takenate D-102, Takenate D-110N, Takenate D-200, and Takenate D-202 (from Takeda Chemical Industries, Ltd.); and Desmodur L, Desmodur IL, Desmodur N, and Desmodur HL (from Sumitomo Bayer Urethane Co., Ltd.). They can be used either alone or as a combination of two or more thereof taking advantage of difference in curing reactivity.

The magnetic layer usually contains various functional additives according to necessity, such as lubricants, abrasives, dispersants, antistatics, plasticizers, and antifungals.

Lubricants which can be used in the magnetic layer include silicone oils, such as dialkylpolysiloxanes having 1 to 5 carbon atoms in the alkyl moiety, dialkoxypolysiloxanes having 1 to 4 carbon atoms in the alkoxy moiety, monoalkylmonoalkoxypolysiloxanes having 1 to 5 carbon atoms in the alkyl moiety and 1 to 4 carbon atoms in the alkoxy moiety, phenylpolysiloxane, and fluoroalkylpolysiloxanes having 1 to 5 carbon atoms in the alkyl moiety; conductive powders such as graphite; inorganic powders, such as molybdenum disulfide, tungsten disulfide, boron nitride, and graphite fluoride; powder of plastics, such as α-olefin polymers (e.g., polyethylene and polypropylene), ethylene-vinyl chloride copolymers, and polytetrafluoroethylene; fatty acids, such as saturated fatty acids that are solid at room temperature (C10–C22), unsaturated aliphatic hydrocarbons that are liquid at room temperature (compounds having an n-olefin double bond at the end carbon atom; carbon atom number: 10 to 22); fatty acid esters between monobasic fatty acids having 12 to 20 carbon atoms and monohydric alcohols having 3 to 12 carbon atoms; polyglycols, alkylphosphoric esters, fluorine-containing alcohols, and fluorocarbons.

Among them preferred are saturated fatty acids and fatty acid esters. Saturated fatty acids and fatty acid esters are preferably used in combination. Examples of alcohols making the fatty acid esters are monohydric ones, such as ethanol, butanol, phenol, benzyl alcohol, 2-methylbutyl alcohol, 2-hexyldecyl alcohol, propylene glycol monobutyl ether, ethylene glycol monobutyl ether, dipropylene glycol monobutyl ether, diethylene glycol monobutyl ether, and sec-butyl alcohol; and polyhydric alcohols, such as ethylene glycol, diethylene glycol, neopentyl glycol, glycerol, and sorbitan derivatives. Examples of fatty acids making the fatty acid esters are acetic acid, propionic acid, octanoic acid, 2-ethylhexanoic acid, lauric acid, myristic acid, palmitic acid, stearic acid, arachic acid, behenic acid, oleic acid, linoleic acid, linolenic acid, elaidic acid, and palmitoleic acid, and mixtures thereof. Examples of the fatty acid esters are butyl stearate, sec-butyl stearate, isopropyl stearate, butyl oleate, amyl stearate, 3-methylbutyl stearate, 2-ethylhexyl stearate, 2-hexadecyl stearate, butyl palmitate, 2-ethylhexyl myristate, butyl stearate/butyl palmitate mixture, butoxyethyl stearate, 2-butoxy-1-propyl stearate, dipropylene glycol monobutyl ether stearate, diethylene glycol dipalmitate, diol obtained by acylating hexamethylene diol with myristic acid, and glycerol oleate.

The configuration of the starting fatty acids and/or alcohols, such as isomeric configurations (branched or straight, cis or trans, etc.) and the branching position, is selected appropriately so as to reduce hydrolysis of fatty acid esters which often occurs when a magnetic recording medium is used in high humidity.

The lubricant is usually used in an amount of 0.2 to 20 parts by weight per 100 parts by weight of the binder. In particular, a fatty acid is used in an amount of 0.1 to 2.0 parts by weight, preferably 0.3 to 1.5 parts by weight, per 100 parts by weight of the hexagonal ferrite powder and/or the non-magnetic powder (for lower layer), and a fatty acid ester is used in an amount of 0.5 to 3.0 parts by weight, preferably 0.7 to 2.5 parts by weight, per 100 parts by weight of the hexagonal ferrite powder and/or the non-magnetic powder (for lower layer).

The abrasive which can be used in the magnetic layer includes those commonly employed, such as α-alumina, γ-alumina, fused alumina, corundum, artificial corundum, silicon carbide, chromium oxide (Cr$_2$O$_3$), diamond, artificial diamond, garnet, emery (mainly comprising corundum and magnetite), and α-Fe$_2$O$_3$. These abrasives have a Mohs hardness of 6 or greater. Examples of commercially available abrasives which can be used in the invention are AKP-10, AKP-12, AKP-15, AKP-20, AKP-30, AKP-50, HIT-50, HIT-60A, HIT-60G, IHT-70, HIT-80, HIT-82, and HIT-100 (from Sumitomo Chemical Co., Ltd.); G5, G7, S-1, and chromium oxide K (from Nippon Chemical Industry Co., Ltd.); UB40B (from Uyemura & Co., Ltd.); WA8000 and WA10000 (from Fujimi Kenmazai K.K.); and TF100, TF140, and TF180 (from Toda Kogyo Corp.). An effective particle size of the abrasive is 0.02 to 2 μm, preferably 0.03 to 1.0 μm. The abrasive is used in an amount of 1 to 20 parts by weight, preferably 1 to 15 parts by weight, per 100 parts by weight of the hexagonal ferrite powder. Addition of less than 1 part by weight of the abrasive is insufficient for durability. More than 20 parts of the abrasive can cause deterioration of surface properties and packing density of the hexagonal ferrite powder. The abrasive may be previously dispersed in a binder before addition to a magnetic coating composition.

In addition to the above-described additives, electrically conductive particles may be added to the magnetic layer as an antistatic agent. In the case of a multilayer structure, however, it is preferred to add the conductive particles to a layer other than the uppermost layer and minimize the amount of the conductive particles in the uppermost layer so that the saturated magnetic flux density of the uppermost layer may be maximized. Carbon black is a particularly preferred antistatic agent for reducing the surface resistivity of the magnetic recording medium as a whole. Carbon black which can be used in the invention includes furnace black for rubber, thermal black for rubber, carbon black for colors, conductive carbon black, and acetylene black. The carbon black preferably has a specific surface area of 5 to 500 m$^2$/g, a DBP oil absorption of 10 to 1500 ml/100 g, a particle size of 5 to 300 nm, a pH of 2 to 10, a water content of 0.1 to 10% by weight, and a tap density of 0.1 to 1 g/ml.

Specific examples of commercially available carbon black which can be used in the invention include Black Pearl S 2000, 1300, 1000, 900, 800, and 700, and Vulcan XC-72 (from Cabot Corp.); #80, #60, #55, #50, and #35 (from Asahi Carbon Co., Ltd.); #3950B, #2700, #2650, #2600, #2400B, #230, #900, #1000, #95, #30, #40, #10B, MA230, MA220, and MA77 (from Mitsubishi Chemical Corp.); Conductex S.C., RAVEN 150, 50, 40, and 15 (from Columbian Carbon); and Ketjen Black EC, Ketjen Black ECDJ-500, and Ketjen Black ECDJ-600 (from Lion Akzo Co., Ltd.). Carbon black having been surface treated with a dispersant, etc., carbon black having been subjected to oxidation treatment, resin-grafted carbon black, or carbon black with its surface partially graphitized may be used. Carbon black may previously been dispersed in a binder before being added to a coating composition. The carbon black, if used in the magnetic layer, is preferably used in an amount of 0.1 to 30% by weight based on the hexagonal ferrite powder. When added to the non-magnetic layer, it is preferably used in an amount of 3 to 20% by weight based on the total non-magnetic powder.

In general, carbon black serves for not only antistatic control but reduction of frictional coefficient, reduction of light transmission, film strength enhancement, and the like. These functions vary depending on the species. Accordingly, it is possible, or rather desirable, to optimize the kinds, amounts, and combinations of the carbon black species for each layer according to the intended purpose with reference to the above-mentioned characteristics, such as particle size, oil absorption, conductivity, pH, and so forth. In selecting carbon black species to be used, reference can be made, e.g., in Carbon Black Kyokai (ed.), Carbon Black Binran.

The layer structure of the magnetic recording medium according to the invention is not particularly limited as long as there is at least a magnetic layer on the support. A non-magnetic layer may be provided between the support and the magnetic layer. The magnetic layer or the non-magnetic layer may have a multilayer structure. In the present invention a multilayer structure having at least two layers on the support is effective for achieving high recording density. For providing the two or more layers, a simultaneous coating system (wet-on-wet coating system) is particularly superior for capability of forming an ultrathin magnetic layer. The wet-on-wet coating system available includes the following three methods, in which a "lower layer" refers to a layer closer to the support, and an "upper layer", a layer farther from the support.

(a) A method comprising forming a lower layer by using a coating apparatus generally employed for a magnetic coating composition, such as a gravure coater, a roll coater, a blade coater or an extrusion coater, and applying an upper layer while the lower layer is wet by means of an extrusion coating apparatus disclosed in JP-B-1-46186, JP-A-60-238179 and JP-A-2-265672, which is of the type that a support is pressed while coated.

(b) A method in which a lower layer coating composition and an upper layer coating composition are applied almost simultaneously through a single coating head disclosed in JP-A-63-88080, JP-A-2-17971, and JP-A-2-265672, the coating head having two slits through which the respective coating compositions pass.

(c) A method in which the upper and lower layers are applied almost simultaneously by means of an extrusion coating apparatus disclosed in JP-A-2-174965, the apparatus being equipped with a back-up roll.

Where a magnetic layer as an upper layer and a non-magnetic layer as a lower layer are formed by the wet-on-wet system, it is desirable that the flow characteristics of a magnetic coating composition and those of a non-magnetic coating composition be as close to each other as possible so as to eliminate interfacial disturbance between the two layers and to form an upper magnetic layer with uniform thickness (little thickness variation). The flow characteristics of the coating compositions largely depend on the combination of the powder and the binder resin. Notice should be taken particularly of selection of the non-magnetic powder to be used in the lower non-magnetic layer. The two layers can be formed by successive coating as a matter of course. In this case, the lower layer formed on the support is once dried. The lower layer-coated support may be wound up and calendered before the upper layer coating composition is applied.

The thickness of the support is usually 1 to 100 μm. It is preferably 3 to 15 μm for use in magnetic recording tapes and 30 to 80 μm for use in flexible disks. The thickness of the magnetic layer is usually 0.03 to 2.5 μm, preferably 0.04 to 2.0 μm, still preferably 0.04 to 0.5 μm. The thickness of the non-magnetic layer is 0.5 to 5 μm, preferably 0.5 to 3.0 μm. The magnetic recording medium can comprise other layers than the magnetic layer and the non-magnetic layer according to the necessity. For example, an undercoating layer may be provided between the support and the lower layer, and a backcoating layer may be provided on the support on the side opposite to the magnetic layer side. The undercoating layer is 0.01 to 2 μm thick, preferably 0.05 to 0.5 μm thick. The backcoating layer is 0.1 to 2 μm thick, preferably 0.3 to 1.0 μm thick. The materials of the undercoating layer and the backcoating layer are known. Magnetic recording disks, which are one embodiment of the present invention, may be either one-sided or two-sided.

The support used in the invention includes, but is not limited to, film of plastics, e.g., polyethylene terephthalate, polyethylene, polypropylene, polycarbonate, polyethylene naphthalate, polyamide, polyamideimide, polyimide, polysulfone, and polyether sulfone, and foil of metals, e.g., aluminum and stainless steel.

It is desirable for effectively accomplishing the object of the invention that the support have a center-line average surface roughness Ra of 0.03 μm or smaller, preferably 0.02 μm, or smaller, still preferably 0.01 μm or smaller, as measured at a cut-off length of 0.25 mm. It is more desirable for the support to have no projections of 1 μm or greater. The surface roughness profile of the support is freely controllable by the size and amount of a filler which is added to the support according to necessity. Useful fillers for the support include oxides and carbonates of Ca, Si, Ti, etc. and plastics, such as acrylic resins. The support preferably has an F5 value of 5 to 50 kg/mm$^2$ ($\approx$49 to 490 Mpa) in the web running direction (MD) and 3 to 30 kg/mm$^2$ ($\approx$29 to 294 Mpa) in the web width direction (TD). The F5 value in the web running direction is generally greater than that in the web width direction. This does not apply where strength in the width direction is of particular demand.

The support preferably has, in both MD and TD, a thermal shrinkage of 3% or less, particularly 1.5% or less, at 100° C.×30 minutes and of 1% or less, particularly 0.5% or less, at 80° C.×30 minutes, a breaking strength of 5 to 100 kg/mm$^2$ ($\approx$49 to 980 MPa), and an elastic modulus of 100 to 2000 kg/mm$^2$ ($\approx$0.98 to 19.6 GPa).

The organic solvents which can be used in the invention include ketones, such as methyl ethyl ketone, methyl isobutyl ketone, diisobutyl ketone, cyclohexanone, isophorone, and tetrahydrofuran; alcohols, such as methanol, ethanol, propanol, butanol, isobutyl alcohol, isopropyl alcohol, and methylcyclohexanol; esters, such as methyl acetate, butyl acetate, isobutyl acetate, isopropyl acetate, ethyl lactate, and glycol acetate; glycol ethers, such as glycol dimethyl ether, glycol monoethyl ether, and dioxane; aromatic hydrocarbons, such as benzene, toluene, xylene, cresol, and chlorobenzene; chlorinated hydrocarbons, such as methylene chloride, ethylene chloride, carbon tetrachloride, chloroform, ethylene chlorohydrin, and dichlorobenzene; N,N-dimethylformamide, and hexane. These organic solvents do not always need to be 100% pure and may contain impurities, such as isomers, unreacted matter, by-products, decomposition products, oxidation products, and water. The impurity content is preferably 30% or less, still preferably 10% or less. The organic solvents may be varied in kind and amount between the magnetic layer and the non-magnetic layer. Such modifications include, but are not limited to, use of a highly volatile solvent in the lower layer to provide improved surface properties, use of a solvent with high surface tension (e.g., cyclohexanone or dioxane) in the lower layer to improve coating stability, and use of a solvent having a high solubility parameter in the upper layer to increase the packing density.

The magnetic recording medium of the invention is produced by applying a magnetic coating composition on a support and drying. If necessary, the applied coating composition is oriented before drying. The magnetic coating composition is prepared by dispersing the hexagonal ferrite powder, a binder resin and, if desired, necessary additives in an organic solvent. The preparation of the magnetic coating composition comprises at least the steps of kneading and dispersing and, if desired, the step of mixing which is provided before or after the step of kneading and/or the step of dispersing. Each step may be carried out in two or more divided stages. Any of the materials, including the hexagonal ferrite powder, binder, carbon black, abrasive, antistatic, lubricant, and solvent, can be added at the beginning of or during any step. Individual materials may be added in divided portions in two or more steps. For example, polyurethane may be added dividedly in the kneading step, the dispersing step, and a mixing step that is provided for adjusting the viscosity of the dispersion. Various kneading machines can be used to carry out the steps of kneading and dispersing, such as a two-roll mill, a three-roll mill, a ball mill, a pebble mill, a trommel, a sand grinder, an attritor (e.g., Szegvari), a high-speed impeller, a high-speed stone mill, a high-speed impact mill, a disper, a kneader, a high-speed mixer, a homogenizer, and an ultrasonic disperser.

The non-magnetic coating composition can be prepared in the same manner as for the magnetic one.

As a matter of course, known techniques for coating composition preparation can be applied as a part of the process to accomplish the object of the invention. The kneading step is preferably performed using a kneading machine with high kneading power, such as a continuous kneader or a pressure kneader, to assure high output and high C/N. In using a continuous kneader or a pressure kneader, the hexagonal ferrite powder, part (preferably at least 30% of the total binder) or the whole of the binder, and 15 to 500 parts by weight of a solvent per 100 parts by weight of the hexagonal ferrite powder are kneaded. For the details of the kneading operation, reference can be made in JP-A-1-106338 and JP-A-1-79274. A simultaneous wet-on-wet coating system, such as the one disclosed in JP-A-62-212933, is suitably used to produce the magnetic recording medium efficiently.

The residual solvent content in the magnetic layer is preferably 100 mg/m$^2$ or less, still preferably 10 mg/m$^2$ or less. It is preferred that the residual solvent content in the magnetic layer be smaller than that in the non-magnetic layer.

The magnetic layer and the non-magnetic layer each preferably have a void of 30% by volume or less, still preferably 20% by volume or less. It is preferred for the non-magnetic layer to have a higher void than the magnetic layer. The non-magnetic layer may have a smaller void than the magnetic layer as long as the void of the former is 5% by volume or higher.

Where the magnetic recording medium has a non-magnetic layer under the magnetic layer, it is easily anticipated that the physical properties are varied between the magnetic layer and the non-magnetic layer according to the purpose. For example, the elastic modulus of the magnetic layer can be set relatively high to improve running durability, while that of the non-magnetic layer can be set lower than that of the upper layer to improve head contact.

If necessary, the magnetic coating composition applied to the support is subjected to treatment for orientation of the hexagonal ferrite powder and then dried. If desired, the dried film is smooth finished and trimmed to shape to give the magnetic recording medium of the invention.

The magnetic layer preferably has, in both MD and TD, an elastic modulus at 0.5% elongation of 100 to 2000 kg/mm$^2$ ($\approx$980 to 19600 N/mm$^2$) and a breaking strength of 10 to 70 kg/mm$^2$ ($\approx$98 to 686 N/mm$^2$). The magnetic recording medium preferably has, in both MD and TD, an elastic modulus of 100 to 1500 kg/mm$^2$ ($\approx$980 to 14700 N/mm$^2$), a residual elongation of 0.5% or less, and a thermal shrinkage of 1% or less, particularly 0.5% or less, especially 0.1% or less, at temperatures of 100° C. or lower.

Applications of the magnetic recording medium of the invention include tapes for video or computer backup and floppy disks and magnetic disks for data storage. It is especially effective in applications for digital recording where dropout (loss of signal) is fatal. Where the thickness of the upper layer is 0.5 μm or smaller, there is obtained a high-density high-capacity magnetic recording medium having high electromagnetic characteristics and excellent overwrite performance.

EXAMPLES

The present invention will now be illustrated in greater detail with reference to Examples, but it should be understood that the invention is not construed as being limited thereto. Unless otherwise noted, all the percents and parts are by weight. Preparation of M type hexagonal ferrite powders A to D:

The indicated amounts, in terms of an oxide, of the following compounds were weighed out.

| | |
|---|---|
| $B_2O_3$: | 4.7 mol |
| $BaCO_3$: | 10.0 mol |
| $Fe_2O_3$ | 11.3 mol |
| $CoCO_3$: | 0.56 mol |
| ZnO: | 0.50 mol |
| $Nb_2O_5$: | 0.12 mol |

The weighed components were thoroughly blended in a powder mixer. The blend was put into a Pt—Ru crucible equipped with a stirrer and melted in a high frequency induction heater at 1300 to 1350° C. for 2 hours. A given amount of the melt was poured between a pair of rotating stainless steel chill rollers and quenched into amorphous ribbons, which were ground to powder. The powder was spread in a ceramic container to a thickness of 2 cm and annealed in an electric oven kept at 550±5° C. for 3 hours and then in an electric oven kept at 700±5° C. for 4 hours. The thus treated powder was put into a metal hopper and cooled to obtain a crystallized powder. The powder was pulverized in a ball mill, immersed in a 2 mol/l acetic acid aqueous solution at 80° C. for 5 hours to dissolve out glass components. The crystallites were collected by filtration, which were found to be of magnetoplumbite type by X-ray diffractometry.

1) Magnetic Powder A

The crystallites were stirred in water containing 30 ppm sulfate ions, followed by allowing to settle. The supernatant liquor was removed, and an aqueous $Al_2(SO_4)_3$ solution was added to the residue in an amount of 1.0%, in terms of $Al_2O_3$, based on the solid content of the barium ferrite crystals and mixed. The resulting suspension was maintained at 30° C. while stirring, and an aqueous NaOH solution was added to adjust to pH 8.5. The suspension was filtered by use of a filter press, and the filter cake was washed with water and dried at 100° C. for 3 hours.

2) Magnetic Powder B

The crystallites were stirred in water containing 30 ppm sulfate ions, followed by allowing to settle. The supernatant liquor was removed, and an aqueous $Al_2(SO_4)_3$ solution was added to the residue in an amount of 1.0%, in terms of $Al_2O_3$, based on the solid content of the barium ferrite crystals and mixed. The resulting suspension was maintained at 30° C. while stirring, and an aqueous NaOH solution was added to adjust to pH 8.5. An aqueous $ZnSO_4$ solution was added to the suspension in an amount of 2.0%, in terms of ZnO, based on the solid content of the barium ferrite crystals. The pH of the suspension was adjusted to 8.0 by addition of an NaOH aqueous solution. The suspension was hydrothermally treated at 180° C. for 60 minutes and then filtered by use of a filter press. The filter cake was washed with water and dried at 100° C. for 3 hours.

3) Magnetic Powder C

The crystallites were stirred in ion-exchanged water, followed by allowing to settle. The supernatant liquor was removed. The resultant slurry was filtered by use of a filter press. The filter cake was washed with water and dried at 100° C. for 3 hours.

4) Magnetic Powder D

The crystallites were stirred in water containing 30 ppm of sulfate ions, followed by allowing to settle. The supernatant liquor was removed, and the resultant slurry was filtered by use of a filter press. The filter cake was washed with water containing 30 ppm of sulfate ions, filtered with a filter press, and dried at 100° C. for 3 hours.

The magnet characteristics of the resulting M type barium ferrite powders A to D were measured with a vibrating sample magnetometer (made by Toei Industry Co., Ltd.) in an applied magnetic field of 800 kA/m. The average particle size was measured by TEM observation. The alkaline earth element/FeESCA intensity ratio (i.e., Ba/Fe ESCA intensity ratio), Al/Fe ESCA intensity ratio, water-soluble Na, Ca, Mg and Ba contents were determined in accordance with the above-described methods. After the powder was dehydrated in nitrogen at 250° C. for 30 minutes, the specific surface area was measured with Quantasorb (made by Quantachrome) by BET single point method. The results obtained are shown in Table 2 below.

TABLE 2

| | | Magnetic Powder | | | |
|---|---|---|---|---|---|
| | | A | B | C | D |
| Average Diameter (nm) | | 23.3 | 23.5 | 23.2 | 23.1 |
| Average Thickness (nm) | | 7.1 | 7.1 | 7.1 | 7.1 |
| Average $S_{BET}$ ($m^2$/g) | | 65.7 | 64.8 | 72.6 | 72.5 |
| Hc (kA/m) | | 183.8 | 183.4 | 183.2 | 182.5 |
| σs (A · $m^2$/kg) | | 47.8 | 46.8 | 50.5 | 51.3 |
| ESCA Intensity | Ba/Fe | 0.14 | 0.15 | 0.11 | 0.16 |
| Ratio | Al/Fe | 0.10 | 0.11 | 0.00 | 0.00 |
| Water-soluble | Na | 1.5 | 2.6 | 2.3 | 2.1 |
| Cation (ppm/g) | Ca | 0.0 | 0.0 | 0.0 | 2.5 |
| | Mg | 0 | 1 | 0 | 1 |
| | Ba | 0.2 | 0.1 | 2 | 0.2 |

Preparation of M Type Hexagonal Ferrite Powders E to K:

The indicated amounts, in terms of an oxide, of the following compounds were weighed out.

| | |
|---|---|
| $B_2O_3$: | 8.5 mol |
| $BaCO_3$: | 4.0 mol |
| $Fe_2O_3$: | 11.3 mol |
| $CoCO_3$: | 0.56 mol |
| ZnO: | 0.50 mol |
| $Nb_2O_5$: | 0.12 mol |

The components other than $B_2O_3$ were dissolved in citric acid at 120° C. The solution was maintained at about 200° C. to uniformly mix up the components. The mixture was hydrolyzed at 450° C. The reaction mixture was fired in air at 600° C. to remove free carbon. $B_2O_3$ was added to the resulting solid and thoroughly blended in a powder mixer. The blend was put into a Pt—Ru crucible equipped with a stirrer and melted at 1300 to 1350° C. for 2 hours. A given amount of the melt was poured between a pair of rotating stainless steel chill rollers and quenched into amorphous ribbons, which were ground to powder. The powder was spread in a ceramic container to a thickness of 2 cm and annealed in an electric oven kept at the crystallizing temperature shown in Table 3 (set temperature±5° C.) for 5 hours. The thus treated powder was put into a metal hopper of room temperature and cooled to obtain a crystallized powder. The powder was pulverized in a planetary mill, immersed in a 2 mol/l acetic acid aqueous solution at 80° C. for 5 hours to dissolve out glass components, followed by filtration to collect crystallites, which were found to be of magnetoplumbite type by X-ray diffractometry. The crystallites were stirred in water containing 30 ppm sulfate ions, followed by allowing to settle. The supernatant liquor was removed, and an aqueous $Al_2(SO_4)_3$ solution was added to the residue in an amount of 1.0%, in terms of $Al_2O_3$, based on the solid content of the barium ferrite crystals and mixed. The resulting suspension was maintained at 30° C. while stirring. An aqueous NaOH solution was added to adjust to pH 8.5. The suspension was filtered by use of a filter press, and the filter cake was washed with water and dried at 100° C. for 3 hours.

The characteristics of the resulting M type barium ferrite were measured in the same manner as described above. The results obtained are shown in Table 3.

grinder, and suspended in water in a concentration of 2%. To the suspension was added an aluminum sulfate solution while stirring to provide a predetermined amount of aluminum (see Table 4 below, given in wt % with respect to Fe in the suspension). The suspension was adjusted to pH 8.5 with aqueous ammonia. After allowing the mixture to stand at 60° C. for 1 hour, the mixture was filtered, and the collected solid was washed with water, dried, and densified to obtain hematite A.

The $\alpha$-$Fe_2O_3$ after annealing was mixed with a 0.01N sodium hydroxide aqueous solution, ground in a sand grinder, and suspended in water in a concentration of 2%. To the suspension was added an aluminum sulfate solution containing a predetermined amount of aluminum (see Table 4 below, given in wt % with respect to Fe in the suspension) while stirring. The suspension was adjusted to pH 8.0 with a sodium hydroxide solution. A zinc sulfate solution containing a predetermined amount of zinc (see Table 4, given in wt % with respect to Fe in the suspension) was added to the suspension while stirring. The suspension was adjusted to pH 8.5 with a sodium hydroxide solution. After allowing

TABLE 3

| | | Magnetic Powder | | | | | |
|---|---|---|---|---|---|---|---|
| | E | F | G | H | I | J | K |
| Crystallizing Temp. (° C.) | 600 | 630 | 660 | 700 | 730 | 760 | 800 |
| Average Diameter (nm) | 14.1 | 15.4 | 18.6 | 22.3 | 27.5 | 33.7 | 38.6 |
| Average Thickness (nm) | 4.9 | 5.1 | 5.8 | 6.5 | 7.6 | 8.9 | 9.8 |
| $S_{BET}$ (m²/g) | 111.5 | 104.9 | 89.9 | 78.0 | 65.4 | 54.8 | 49.1 |
| Hc (kA/m) | 123.4 | 130.6 | 151.3 | 167.2 | 171.2 | 175.2 | 177.5 |
| σs (A · m²/kg) | 42.3 | 44.1 | 47.5 | 48.6 | 51.4 | 53.3 | 54.8 |
| ESCA Intensity Ratio Ba/Fe | 0.13 | 0.14 | 0.14 | 0.14 | 0.14 | 0.14 | 0.14 |
| Al/Fe | 0.08 | 0.08 | 0.09 | 0.11 | 0.13 | 0.15 | 0.17 |
| Water-soluble Cation (ppm/g) Na | 8.5 | 7.2 | 5.4 | 2.1 | 1.8 | 1.6 | 2.2 |
| Ca | 0 | 1 | 0 | 1 | 0 | 0 | 1 |
| Mg | 1 | 0 | 0 | 0 | 0 | 1 | 2 |
| Ba | 1.1 | 0.8 | 0.5 | 0.4 | 0.3 | 0.3 | 0.3 |

It is seen that the change in crystallizing temperature results in change of average particle diameter. With the raw material composition being equal, Hc and σ vary with the change of shape.

Preparation of Non-Magnetic Powder for Lower Layer:

Sodium silicate was added to a ferrous sulfate aqueous solution at 20° C. at an Si/Fe atomic ratio of 1% while bubbling the solution with nitrogen for oxidation prevention. A sodium hydroxide solution was added to the mixture in an amount of 60% of the neutralization equivalent to form ferrous hydroxide. The reaction system was maintained at 20° C. to oxidize the ferrous hydroxide with air to form $\alpha$-FeOOH (goethite) seed crystals. While keeping the system at 40° C. and bubbled with nitrogen to prevent oxidation, a sodium hydroxide solution was added thereto, and the formed ferrous hydroxide was oxidized with air to form goethite, which was washed with water, filtered, shaped, and dried. The resulting goethite had a specific surface area of 112 m²/g.

The goethite was dehydrated by heating at 300° C. for 1 hour to obtain $\alpha$-$Fe_2O_3$, which was annealed at 680° C. for 2 hours. The resulting $\alpha$-$Fe_2O_3$ was mixed with a 0.01N sodium hydroxide aqueous solution, ground in a sand the mixture to stand at 80° C. for 1 hour, the mixture was filtered, and the collected solid was washed with water, dried, and densified to obtain hematite B or C.

The resulting hematite powders A, B, and C were analyzed for pH, capability of forming iron complexes, specific surface area, and water-soluble Na, Ca, Mg, and Ba contents. The specific surface area was measured on a sample having been heated at 250° C. for 30 minutes with Quantasorb (made by Quantachrome) by BET single point method. The water-soluble Na, Ca, Mg, and Ba contents were measured by ICP-AES on a sample solution prepared by extracting 5 g of the powder with 100 ml of distilled water for 1 hour with stirring and filtering the supernatant liquor. The results obtained are shown in Table 4.

TABLE 4

| | | Hematite A | Hematite B | Hematite C |
|---|---|---|---|---|
| Surface Treatment | Al (wt %) | 2 | 1 | 2 |
| | Zn (wt %) | 0 | 2 | 1 |
| $S_{BET}$ (m²/g) | | 59.2 | 58.5 | 59.5 |
| Fe Complex Formation (ppm/g) | | 8.8 | 1.5 | 0.7 |

TABLE 4-continued

|  |  | Hematite A | Hematite B | Hematite C |
|---|---|---|---|---|
| pH |  | 7.9 | 8.2 | 8.2 |
| Water-soluble | Na | 1 | 2 | 1 |
| Cation | Ca | 3 | 4 | 5 |
| (ppm/g) | Mg | 1 | 2 | 1 |
|  | Ba | 1 | 0 | 0 |

Examples 1 to 9 and Comparative Examples 1 to 3

Magnetic Coating Composition:

| | |
|---|---|
| Hexagonal ferrite powder (see Table 5) | 100 parts |
| Binder resin | |
| Vinyl chloride copolymer (containing 1 × 10$^{-4}$ eq/g of –SO$_3$Na group; degree of polymerization: 300) | 14 parts |
| Polyester polyurethane resin (neopentyl glycol/caprolactone polyol/diphenylmethane-4,4'-diisocyanate (MDI) = 0.9/2.6/1 (by mole); containing 1 × 10$^{-4}$ eq/g of –SO$_3$Na group) | 6 parts |
| α-Alumina (average particle size: 0.15 μm) | 10 parts |
| Carbon black (average particle size: 40 nm) | 3.0 parts |
| Butyl stearate | 1.5 parts |
| Stearic acid | 2.5 parts |
| Methyl ethyl ketone/cyclohexanone (1/1) | 250 parts |

The hexagonal ferrite powder and the vinyl chloride copolymer were kneaded with 130 parts (out of 250 parts) of the 1:1 mixed solvent, of methyl ethyl ketone and cyclohexanone in a kneader. The rest of the above components were mixed therein, and the mixture was dispersed in a sand grinder together with zirconia beads of 1 mm in diameter. Six parts of polyisocyanate was added to the dispersion, and 20 parts of a 1:1 mixed solvent of methyl ethyl ketone and cyclohexanone was further added thereto, followed by filtration to prepare a coating composition for a magnetic layer.

| | |
|---|---|
| Non-magnetic coating composition: | |
| Acicular hematite (see Table 5) | 80 parts |
| α-Alumina (average particle size: 0.11 μm) | 4.0 parts |
| Carbon black (average particle size: 17 nm; DBP oil absorption: 80 ml/100 g; S$_{BET}$: 240 m$^2$/g; pH: 7.5) | 20 parts |
| Binder resin | |
| Vinyl chloride copolymer (containing 1 × 10$^{-4}$ eq/g of –SO$_3$Na group; degree of polymerization: 300) | 14 parts |
| Polyester polyurethane resin (neopentyl glycol/caprolactone polyol/MDI = 0.9/2.6/1 (by mole); containing 1 × 10$^{-4}$ eq/g of –SO$_3$Na) | 6 parts |
| Methyl ethyl ketone/cyclohexanone (1/1) to be added in kneading | 120 parts |
| Butyl stearate | 1 part |
| Stearic acid | 2.5 parts |
| Methyl ethyl ketone/cyclohexanone (1/1) to be added in dispersing | 110 parts |

The acicular hematite, α-alumina, carbon black, vinyl chloride copolymer, and 1:1 mixed solvent of methyl ethyl ketone and cyclohexanone (120 parts) were kneaded in a kneader, and the rest of the above components were mixed therein. The mixture was dispersed in a sand grinder. Five parts of polyisocyanate and then 20 parts of a 1:1 mixed solvent of methyl ethyl ketone and cyclohexanone were added to the dispersion, followed by filtering through a filter having an average opening size of 1 μm to prepare a non-magnetic coating composition.

Magnetic recording media were produced as follows by using various combinations of a magnetic coating composition and a non-magnetic coating composition shown in Table 5. The non-magnetic coating composition was applied to a 7 μm thick polyethylene terephthalate film to a dry thickness of 1.5 μm. While the applied non-magnetic coating composition was wet, the magnetic coating composition was applied thereon to a dry thickness of 0.10 μm. While the two layers were wet, the magnetic layer was longitudinally oriented by passing the coated film through a rare earth magnetic (surface magnetic flux density: 500 mT) and then a solenoid magnet (magnetic flux density: 500 mT). While passing through the solenoid, the coating layers were dried to such an extent that the hexagonal ferrite powder might not be deoriented. The coated film was further dried in a drying zone and wound. The coated film was passed through a 7-roll calender composed of metal rolls at a roll temperature of 90° C. to obtain a magnetic recording medium in web form, which was slit into 8 mm wide video tapes.

Each of the resulting magnetic tapes was measured for electromagnetic characteristics, magnetic characteristics, surface roughness, frictional coefficient in the initial stage, and frictional coefficient after storage at 60° C. and 90% RH for 7 days in accordance with the following methods. The results obtained are shown in Table 5.

1) Electromagnetic Characteristics

The magnetic tape was run on an 8 mm deck for data recording equipped with an MIG head (head gap: 0.2 μm; track width: 17 μm; saturation magnetic flux density: 1.5 T; azimuth angle: 20°) and an MR head for reading (SAL bias; MR element: Fe—Ni; track width: 6 μm; gap length: 0.2 μm; azimuth angle: 20°). An optimum recording current was decided from the input/output characteristics in recording ½ Tb (λ=0.5 μm) signals at a relative running speed of the tape of 10.2 m/sec (with respect to the head) Signals were recorded at the optimum current with the MIG head and reproduced with the MR head. The C/N was defined to be a ratio of reproduced carrier peak to demagnetization noise. The resolution band width of a spectral analyzer was set at 100 kHz. The output and the C/N were relatively expressed taking the results of Comparative Example 3 as a standard. The tape having been recorded and measured for the output was stored at 60° C. and 90% RH for 10 days and again measured for the output to obtain an output change due to the storage.

2) Magnetic Characteristics

Magnetic characteristics were measured with a vibrating sample magnetometer in an applied magnetic field of 800 kA/m. SQ in Table 5 stands for squareness.

3) Surface Roughness

The surface profile of a 250 μm side square of a sample was measured with a three-dimensional profilometer TOPO-3D, made by Wyko. In computing the measured values, corrections such as tilt correction, spherical correction and cylindrical correction were made in accordance with JIS B601. The mean surface average roughness Ra was taken as a measure of surface roughness.

4) Frictional Coefficient

The tape, in the initial stage and after the stage, was brought into contact with a stainless steel pole at a wrap angle of 180° under a tension of 50 g (T1). The tension (T2) required for running the tap at a speed of 3.3 cm/sec was measured. The frictional coefficient (μ) of the tape was calculated from equation:

$$\mu = 1/\pi \cdot \ln(T2/T1)$$

TABLE 5

| | Magnetic Powder | Hematite | Hc (kA/m) | SQ | Ra (nm) | Frictional Coefficient Initial | Frictional Coefficient After Storage | Output (dB) | C/N (dB) | Output Change (dB) |
|---|---|---|---|---|---|---|---|---|---|---|
| Example: | | | | | | | | | | |
| 1 | A | A | 194.2 | 0.669 | 2.5 | 0.25 | 0.32 | 1.1 | 1.8 | −0.2 |
| 2 | A | B | 194.1 | 0.668 | 2.4 | 0.26 | 0.29 | 1.1 | 1.7 | −0.2 |
| 3 | A | C | 194.1 | 0.667 | 2.3 | 0.26 | 0.29 | 1.2 | 2.0 | −0.1 |
| 4 | B | A | 193.7 | 0.675 | 2.6 | 0.25 | 0.30 | 1.2 | 1.9 | −0.2 |
| 5 | B | B | 193.6 | 0.677 | 2.6 | 0.25 | 0.28 | 1.1 | 1.8 | −0.1 |
| 6 | B | C | 193.7 | 0.679 | 2.5 | 0.24 | 0.26 | 1.1 | 1.8 | −0.1 |
| 7 | C | A | 193.2 | 0.655 | 2.7 | 0.24 | 0.35 | 0.8 | 1.5 | −0.2 |
| 8 | C | B | 193.3 | 0.658 | 2.7 | 0.23 | 0.31 | 0.8 | 1.6 | −0.3 |
| 9 | C | C | 193.2 | 0.657 | 2.8 | 0.23 | 0.30 | 0.8 | 1.5 | −0.2 |
| Comparative Example: | | | | | | | | | | |
| 1 | D | A | 193.1 | 0.643 | 2.7 | 0.26 | 0.49 | 0.0 | −0.1 | −3.1 |
| 2 | D | B | 193.2 | 0.644 | 2.8 | 0.26 | 0.45 | −0.1 | −0.2 | −2.8 |
| 3 | D | C | 193.1 | 0.645 | 2.8 | 0.25 | 0.45 | 0.0 | 0.0 | −3.2 |

It is seen that the magnetic recording tapes of Comparative Examples 1 to 3 which use an M type hexagonal ferrite powder having a high Ba/Fe ESCA intensity ratio are inferior to those of Examples 1 to 9 in output and C/N and, when stored under high-temperature and high-humidity conditions, undergo frictional coefficient increase and output change. Observation of the surface of the comparative tapes under a scanning microscope revealed pointy projections, which are considered to cause spacing loss, resulting in output reduction.

Examples 10 to 14 and Comparative Examples 4 and 5

Magnetic Layer Coating Composition:

| | |
|---|---|
| Hexagonal ferrite powder (see Table 6) | 100 parts |
| Binder resin | |
| Vinyl chloride copolymer (containing 1 × 10$^{-4}$ eq/g of −SO$_3$Na group; degree of polymerization: 300) | 13 parts |
| Polyester polyurethane resin (neopentyl glycol/capro-lactone polyol/MDI = 0.9/2.6/1 (by mole); containing 1 × 10$^{-4}$ eq/g of −SO$_3$Na group) | 5 parts |
| Methyl ethyl ketone/cyclohexanone (1:1) to be added in kneading | 130 parts |
| α-Alumina (average particle size: 0.13 μm) | 5.0 parts |
| Carbon black (average particle size: 40 nm) | 1.0 part |
| Butyl stearate | 1 part |
| Stearic acid | 2 parts |
| Methyl ethyl ketone/cyclohexanone (1:1) to be added in dispersing | 140 parts |

The hexagonal ferrite powder and the vinyl chloride copolymer were kneaded with the 1:1 mixed solvent (130 parts) of methyl ethyl ketone and cyclohexanone in a kneader. The rest of the components were mixed therein, and the mixture was dispersed in a sand grinder. To the dispersion was added 5 parts of polyisocyanate, and an additional 20 part mixed solvent of methyl ethyl ketone and cyclohexanone (1:1) was added. The mixture was filtered through a filter having an average opening size of 1 μm to prepare a coating composition for a magnetic layer.

Non-magnetic layer coating composition:

| | |
|---|---|
| Acicular hematite C | 80 parts |
| α-Alumina (average particle size: 0.11 μm) | 5.0 parts |
| Carbon black (average particle size: 17 nm; DBP oil absorption: 80 ml/100 g; S$_{BET}$: 240 m$^2$/g; pH 7.5) | 20 parts |
| Binder resin | |
| Vinyl chloride copolymer (containing 1 × 10$^{-4}$ eq/g of −SO$_3$Na group; degree of polymerization: 300) | 12 parts |
| Polyester polyurethane resin (neopentyl glycol/capro-lactone polyol/MDI = 0.9/2.6/1 (by mole); containing 1 × 10$^{-4}$ eq/g of −SO$_3$Na group) | 8 parts |
| Methyl ethyl ketone/cyclohexanone (1:1) to be added in kneading | 120 parts |
| Butyl stearate | 1 part |
| Stearic acid | 2.5 parts |
| Methyl ethyl ketone/cyclohexanone (1:1) to be added in dispersing | 110 parts |

The acicular hematite powder, α-alumina, carbon black, and vinyl chloride copolymer were kneaded with the 1:1 mixed solvent (120 parts) of methyl ethyl ketone and cyclohexanone in a kneader. The rest of the components were mixed therein, and the mixture was dispersed in a sand grinder. Six parts of polyisocyanate was added to the dispersion, and 20 parts of a 1:1 mixed solvent of methyl ethyl ketone and cyclohexanone was further added thereto, followed by filtration through a filter having an opening size of 1 μm to prepare a non-magnetic layer coating composition.

Magnetic recording media were produced as follows by using each of the resulting magnetic coating compositions and the non-magnetic coating composition as shown in Table 6. The non-magnetic coating composition was applied to a 7 μm thick polyethylene terephthalate film to a dry thickness of 1.5 μm. While the applied non-magnetic coating composition was wet, a magnetic coating composition was applied thereon to a dry thickness of 0.10 μm. While the two layers were wet, the magnetic layer was longitudinally oriented by passing the coated film through a rare earth magnetic (surface magnetic flux density: 500 mT) and then a solenoid magnet (magnetic flux density: 500 mT). While passing through the solenoid, the coating layers were dried to such an extent that the hexagonal ferrite powder might not be deoriented. The coated film was further dried in a drying zone and wound. The coated film was passed through a 7-roll calender composed of metal rolls at a roll temperature of 90° C. to obtain a magnetic recording medium in web form, which was slit into 8 mm wide video tapes.

The resulting magnetic tapes were evaluated in the same manner as in Example 1. The results obtained are shown in Table 6, in which the output and C/N are expressed relatively taking those of Comparative Example 5 as a standard.

TABLE 6

| Magnetic Powder | Hema-tite | Hc (kA/m) | SQ | Ra (nm) | Frictional Coefficient | | Output (dB) | C/N (dB) | Output Change (dB) |
| --- | --- | --- | --- | --- | --- | --- | --- | --- | --- |
| | | | | | Initial | After Storage | | | |
| Example: | | | | | | | | | |
| 10 F | C | 142.5 | 0.638 | 2.8 | 0.25 | 0.32 | −0.5 | 1.6 | 0.1 |
| 11 G | C | 162.4 | 0.643 | 2.6 | 0.26 | 0.32 | −0.2 | 1.9 | −0.1 |
| 12 H | C | 177.7 | 0.648 | 2.3 | 0.25 | 0.30 | 0.0 | 2.0 | 0.2 |
| 13 I | C | 182.4 | 0.655 | 2.4 | 0.25 | 0.30 | 0.5 | 2.3 | 0.1 |
| 14 J | C | 184.6 | 0.661 | 2.5 | 0.27 | 0.31 | 1.1 | 2.8 | −0.1 |
| Comparative Example: | | | | | | | | | |
| 4 E | C | 131.9 | 0.615 | 3.2 | 0.25 | 0.42 | −2.3 | −3.3 | −0.5 |
| 5 K | C | 186.9 | 0.662 | 3.4 | 0.26 | 0.36 | 0.0 | 0.0 | −0.3 |

As can be seen from Table 6, use of an M type hexagonal ferrite powder which satisfies the Ba/Fe ESCA intensify ratio requirement but has an average particle diameter smaller than 15 nm results in a large surface roughness on account of difficulty in dispersing, which leads to inferior C/N (Comparative Example 4). On the other hand, an M type hexagonal ferrite powder which satisfies the Ba/Fe ESCA intensify ratio requirement but has an average particle diameter greater than 35 nm results in increased noise (Comparative Example 5).

The present invention uses an M type hexagonal ferrite powder having an average particle size of 15 to 35 nm and an alkaline earth element/Fe ESCA intensity ratio of 0.10 to 0.15. By virtue of this feature, the present invention provides a magnetic recording medium which withstands storage under high-temperature or high-humidity conditions and exhibits satisfactory electromagnetic characteristics This application is based on Japanese Patent application JP 2002-101463, filed Apr. 3, 2002, the entire content of which is hereby incorporated by reference, the same as if set forth at length.

What is claimed is:

1. A magnetic recording medium comprising:
    a support; and
    at least a magnetic layer comprising a hexagonal ferrite powder and a binder,
    wherein the hexagonal ferrite powder is of magnetoplumbite structure comprising an alkaline earth element, has an average diameter of 15 to 35 nm and has an alkaline earth element to iron ratio of 0.10 to 0.15 in terms of peak intensity ratio analyzed by electron spectroscopy for chemical analysis.

2. The magnetic recording medium according to claim 1, wherein the hexagonal ferrite powder comprises barium ferrite and doped barium ferrite.

3. The magnetic recording medium according to claim 1, wherein the hexagonal ferrite powder has an average thickness of 2 to 15 nm.

4. The magnetic recording medium according to claim 1, wherein the hexagonal ferrite powder has a BET specific surface area of 25 to 110 m$^2$/g.

5. The magnetic recording medium according to claim 1, wherein the hexagonal ferrite powder has a water content of 0.3 to 2.0% by weight.

6. The magnetic recording medium according to claim 1, wherein the hexagonal ferrite powder has pH of 5.0 to 12.

7. The magnetic recording medium according to claim 1, wherein the hexagonal ferrite powder has a saturation magnetization of 40 A·m$^2$/kg or higher.

8. The magnetic recording medium according to claim 1, wherein the hexagonal ferrite powder has a coercive force of 135 to 440 kA/m.

9. The magnetic recording medium according to claim 1, wherein the magnetic layer further comprises at least one of a saturated fatty acid and a fatty acid ester as a lubricant.

10. The magnetic recording medium according to claim 1, wherein the support has no projections of 1 μm or greater.

* * * * *